(12) United States Patent
Kennedy et al.

(10) Patent No.: US 6,277,355 B1
(45) Date of Patent: Aug. 21, 2001

(54) SYNTHESIS OF ZSM-5 AND ZSM-11

(75) Inventors: Carrie L. Kennedy, Turnersville; Louis D. Rollmann, Moorestown; John L. Schlenker, Thorofare, all of NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/351,850

(22) Filed: Jul. 13, 1999

(51) Int. Cl.$^7$ .............................. C01B 38/36; C01B 39/40
(52) U.S. Cl. .................. 423/705; 423/708; 423/718; 423/DIG. 22; 423/DIG. 29
(58) Field of Search ..................... 423/705, 708, 423/328.2, DIG. 22, DIG. 29, 718

(56) References Cited

U.S. PATENT DOCUMENTS

| | | |
|---|---|---|
| 3,702,886 | 11/1972 | Argauer et al. . |
| 3,709,979 | 1/1973 | Chu et al. . |
| 4,108,881 | 8/1978 | Rollmann et al. . |
| 4,139,600 | 2/1979 | Rollmann et al. . |
| 4,151,189 | 4/1979 | Rubin et al. . |
| 4,229,424 | 10/1980 | Kokotailo . |
| 4,296,083 * | 10/1981 | Rollmann ................. 423/DIG. 22 |
| 4,401,637 * | 8/1983 | Marosi et al. ................. 423/705 |
| 4,404,175 * | 9/1983 | Marosi et al. ............... 423/DIG. 22 |
| 4,565,681 | 1/1986 | Kuhl . |
| 4,606,900 * | 8/1986 | Kacirek et al. ............. 423/DIG. 22 |
| 5,174,977 | 12/1992 | Chang et al. ................. 423/706 |
| 5,369,071 | 11/1994 | Degnan et al. ................. 502/71 |
| 5,525,323 * | 6/1996 | Mueller et al. ............. 423/DIG. 22 |

FOREIGN PATENT DOCUMENTS 2 066 230 * 7/1981 (GB) .

* cited by examiner

*Primary Examiner*—David R. Sample

(57) ABSTRACT

High activity ZSM-5 and ZSM-11, with alpha values of 1000 to 3500, are produced by synthesis from a reaction mixture containing an organic directing agent selected from a non-cyclic amine having the formula $(C_2H_6N)_n N_m H_q$ wherein n is 1, 2 or 3; m is 0 or 1; q is 0, 1 or 2 and (n+m+q) is either 2 or 4.

7 Claims, 3 Drawing Sheets

SYNTHESIS OF ZSM-5 AND ZSM-11

FIELD OF THE INVENTION

This invention relates to the synthesis of ZSM-5 and ZSM-11 and intergrowths and/or mixtures thereof.

BACKGROUND OF THE INVENTION

ZSM-5 and its synthesis using tetrapropylammonium (TPA) cations as a directing agent are disclosed in U.S. Pat. No. 3,702,886. ZSM-5 has also been synthesized with a wide variety of other organic nitrogen directing agents, for example alkyldiamines having 5–6 carbon atoms (U.S. Pat. No. 4,139,600), dimethylethylpropylammonium (DMEPA) cations (U.S. Pat. No. 4,565,681) and 1,2-diaminocylcohexane (U.S. Pat. No. 5,174,977)

U.S. Pat. No. 4,151,189 discloses that ZSM-5, ZSM-12, ZSM-35 and ZSM-38 can be synthesized using primary amines having 2–9 carbon atoms as the directing agent. In particular Example 12 of this patent discloses synthesis of ZSM-5 using ethylamine as the directing agent. Insufficient information is provided in Example 12 to reach a definitive conclusion as to the silica/alumina molar ratio of the reaction mixture but, assuming the sodium aluminate employed was the normal commercially available material containing 25.5% $Al_2O_3$, the reaction mixture would have a silica/alumina molar ratio of 50. According to Table 2 of the '189 patent, the product of Example 12 was only 85% crystalline, i.e. was impure, and had a silica/alumina weight ratio of 17, which corresponds to a molar ratio of 29. However, the product analysis data in Table 2 does not charge balance, in that although 0.11 moles of alumina are present, there are only 0.06 moles of N and essentially no Na. This strongly suggests that much of the aluminium in the product composition of Table 2 was not in the ZSM-5 lattice and hence the molar ratio of the ZSM-5 was significantly higher than 29.

In addition, U.S. Pat. No. 5,369,071 discloses that ZSM-5 with silica to alumina molar ratios as low as 20.3 and alpha values as high as 1488 can be synthesized in the presence of n-propylamine from a reaction mixture having a pH 10–14, an $OH^-/SiO_2$ ratio of 0.1–0.3, an $M/SiO_2$ ratio of 0.2–0.6 (where M is an alkali or alkaline earth metal) and an $H_2O/SiO_2$ ratio of 10–35.

ZSM-11 and its synthesis using tetrabutylammonium cations as a directing agent are disclosed in U.S. Pat. No. 3,709,979, whereas U.S. Pat. No. 4,108,881 describes the synthesis of ZSM-11 in the presence of an alkyldiamine having 7–12 carbon atoms It is also known from, for example U.S. Pat. No. 4,229,424, to produce intergrowths of ZSM-5 and ZSM-11, that is crystalline materials exhibiting structural features of both zeolites.

To date it has proved extremely difficult to produce ZSM-5 and ZSM-11 with framework silica to alumina molar ratios less than about 20. (See, for example, R. Szostak, Handbook of Molecular Sieves, Van Nostrand Reinhold, NY, N.Y., 1992, pages 520 and 530, respectively.) Framework aluminum sites are responsible for the acid activity of zeolites, and it is desirable for many catalytic uses to be able to produce ZSM-5 and/or ZSM-11 with the highest possible acid activity and hence the lowest possible framework silica to alumina molar ratio.

It is known that the acid activity of a zeolite can be increased by controlled steaming, see U.S. Pat. No. 4,326,994, but such steaming adds an additional step in the catalyst production regime and hence there is a need for a direct synthesis route for producing high activity ZSM-5 and/or ZSM-11.

According to the invention, it has now been found that ZSM-5, ZSM-11 and intergrowths and/or mixtures thereof with extremely high acid activity can be produced using, as a directing agent, a non-cyclic amine having the formula $(C_2H_6N)_nN_mH_q$ wherein n is 1, 2 or 3; m is 0 or 1; q is 0, 1 or 2 and (n+m+q) is either 2 or 4.

It is to be appreciated that, although ZSM-5 and ZSM-11 are normally synthesized as aluminosilicates, the framework aluminum can be partially or completely replaced by other trivalent elements, such as boron, iron and/or gallium, and the framework silicon can be partially or completely replaced by other tetravalent elements such as germanium.

SUMMARY OF THE INVENTION

In one aspect, the invention resides in a process for producing a synthetic porous crystalline material having the X-ray diffraction lines listed in Table I below comprising the steps of:

(a) forming a reaction mixture containing sources of alkali or alkaline earth metal (M) cations, an oxide of a trivalent element (X), an oxide of a tetravalent element (Y), a directing agent (R) and water, wherein said reaction mixture has a composition in terms of mole ratios within the following ranges:

$YO_2/X_2O_3$=15–35
$H_2O/YO_2$=10–50
$OH^-/YO_2$=0.01–0.2
$M/YO_2$=0.1–0.5
$R/YO_2$=0.2–5.0 and wherein the directing agent R is a non-cyclic amine having the formula $(C_2H_6N)_nN_mH_q$ wherein n is n is 1, 2 or 3; m is 0 or 1; q is 0, 1 or 2 and (n+m+q) is either 2 or 4;

(b) maintaining the reaction mixture under crystallization conditions until crystals of said porous crystalline material are formed; and then (c) recovering said crystals from the reaction mixture.

Preferably, the directing agent R is selected from diethylenetriamine, triethylenetetramine and tris(2-aminoethyl)amine.

Preferably, said reaction mixture has a composition in terms of mole ratios within the following ranges:

$YO_2/X_2O_3$=15–30
$H_2O/YO_2$=15–30
$OH^{-/YO}{}_2$=0.02–0.1
$M/YO_2$=0.1–0.3
$R/YO_2$=0.5–2.0

DESCRIPTION OF SPECIFIC EMBODIMENTS

Figure 1:
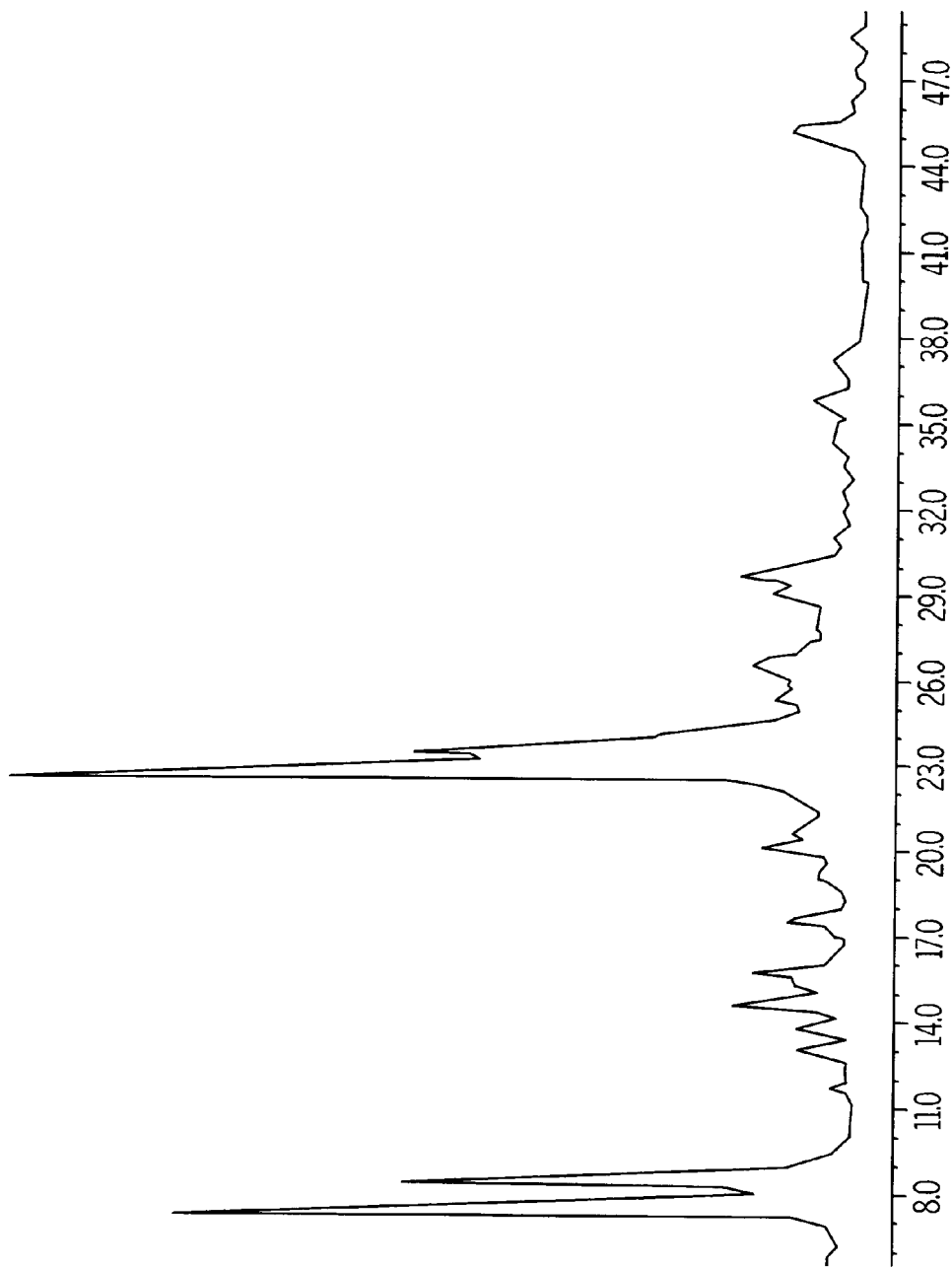
FIG. 1 is the X-ray diffraction pattern of the ammonium form of porous crystalline material formed according to Example 1.

The present invention provides a process for producing ZSM-5, ZSM-11 and intergrowths and/or mixtures thereof which, in their hydrogen form, can have an extremely high acid activity, as measured by their alpha value. Alpha value has long been recognized as a useful measure of acid catalyst activity, and its correlation with framework aluminum content in zeolites has been the subject of a number of publications in the literature, e.g., W. O. Haag, R. M. Lago, and P. B. Weisz, Nature, 309, 589 (1984). Alpha Value compares the catalytic cracking activity of a catalyst (rate of normal hexane conversion per volume of catalyst per unit time) with the activity of a standard silica-alumina cracking catalyst. The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), the entire contents of which are incorporated herein by reference. The experimental conditions of the test used herein include a constant temperature of 538° C. and a variable flow rate as described in detail in the *Journal of Catalysis*, Vol. 61, p. 395.

The process of the invention can produce ZSM-5 and ZSM-11 materials, which in their hydrogen form, have alpha values between 1000 and 3500. More particularly, ZSM-5 materials can be produced having alpha values as high as 2500 and ZSM-11 materials having alpha values as high as 3500.

ZSM-5 and ZSM-11 are structurally similar and sometimes referred to as pentasil zeolites. The ZSM-5, ZSM-11 and their intergrowths and mixtures produced by the process of the invention are characterized by the X-ray diffraction lines in Table I below:

TABLE 1

| D-spacing (Å) | Relative Intensity [100 × I/I(o)] |
|---|---|
| 11.2 +/− 0.2 | M-S |
| 10.1 +/− 0.2 | M-S |
| 3.86 +/− 0.08 | M-VS |
| 3.72 +/− 0.08 | M-S |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40) vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

The crystalline materials produced by the process of the invention have a composition involving the molar relationship:

$$X_2O_3:(n)YO_2$$

wherein X is a trivalent element, such as aluminum, boron, iron and/or gallium, preferably aluminum; Y is a tetravalent element such as silicon and/or germanium, preferably silicon; and n is 10–30, preferably 15–25.

According to the synthesis process of the invention, a reaction mixture is produced containing sources of alkali or alkaline earth metal (M) cations, an oxide of a trivalent element (X), normally alumina, an oxide of a tetravalent element (Y), normally silica, a directing agent (R) and water. The reaction mixture has a composition, expressed in terms of mole ratios of oxides, as follows:

| Component | Useful | Preferred |
|---|---|---|
| $YO_2/X_2O_3$ | 15–35 | 15–30 |
| $H_2O/YO_2$ | 10–50 | 15–30 |
| $OH^-/YO_2$ | 0.01–0.2 | 0.02–0.1 |
| $R/YO_2$ | 0.2–5.0 | 0.5–2.0 |
| $M/YO_2$ | 0.1–0.5 | 0.1–0.3 |

The directing agent R is a non-cyclic amine having the formula $(C_2H_6N)_nN_mH_q$ wherein n is 1, 2 or 3; m is 0 or 1; q is 0, 1 or 2 and (n+m+q) is either 2 or 4. Preferably the, directing agent is selected ethylamine (wherein n=1, m=0 and q=1) or ethylenediamine (wherein n=1, m=1 and q=2) or from the polyamines diethylenetriamine (dien [wherein n=2, m=1, q=1]), triethylenetetramine (trien [wherein n=3, m=1, q=0]) and tris(2-aminoethyl)amine (tren [wherein again n=3, m=1, q=0]), wherein the polyamines have the following structural formulae:

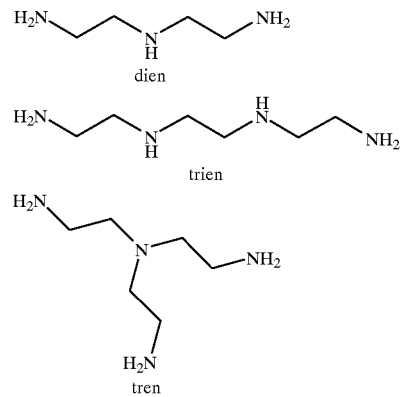

Depending on the directing agent chosen and the silica/alumina molar ratio of the reaction mixture, the zeolite produced will be either ZSM-5, ZSM-11 or a mixture or intergrowth of ZSM-5 and ZSM-11. For example, at silica/alumina molar ratios below 20, the product tends to be a ZSM-5/ZSM-11 intergrowth. At silica/alumina molar ratios of 20–30, the product tends to be ZSM-11 with the tren directing agent and ZSM-5 with ea, dien and trien.

The synthesis method of the invention functions with or without added nucleating seeds. In a preferred embodiment, the reaction mixture contains 0.05–5 wt % nucleating seeds.

Crystallization is carried out under either stirred or static conditions at a temperature of 100 to 200° C., preferably 120 to 170° C., for 6 hours to 10 days and the resultant crystals are separated from the mother liquor and recovered.

When used as a catalyst, it may be desirable to incorporate the zeolite of the invention with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the zeolite produced by the process of the invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided zeolite and inorganic oxide matrix vary widely, with the zeolite content ranging from about 1 to about 90% by weight and more usually, particularly when the composite is prepared in the form of beads, in the range of about 2 to about 80 wt. % of the composite.

The zeolite produced by the process of the invention is useful as a catalyst in hydrocarbon conversion reactions where high activity is important. Such reactions include, for example:

1. disproportionation of alkylaromatics, eg disproportionation of toluene to produce xylenes, with reaction conditions including a temperature of from about 200° C. to about 760° C., a pressure of from about atmospheric to about 60 atmospheres, a weight hourly space velocity (WHSV) of about 0.1 hr–1 to about 20 hr$^{-1}$, and a hydrogen/hydrocarbon mole ratio of 0 (no added hydrogen) to about 50;
2. isomerization of alkylaromatics, such as xylenes, with reaction conditions including a temperature of from about 200° C. to about 540° C., a pressure of from about 100 to about 7000 kPa, a weight hourly space velocity (WHSV) of about 0.1 hr–1 to about 50 hr$^{-1}$, and a hydrogen/hydrocarbon mole ratio of 0 (no added hydrogen) to about 10;
3. oligomerization of olefins with reaction conditions including a temperature of from about 150° C. to about 400° C., a pressure of from about 100 to about 1500 kPa, and a weight hourly space velocity (WHSV) of about 0.1 hr–1 to 100 hr$^{-1}$,
4. aromatization of paraffins and olefins with reaction conditions including a temperature of from about 300° C. to about 600° C., a pressure of from about 100 to about 1500 kPa, and a weight hourly space velocity (WHSV) of about 0.1 hr–1 to 10 hr$^{-1}$,
5. cracking of hydrocarbons with reaction conditions including a temperature of about 300° C. to about 700° C., a pressure of about 0.1 to about 30 atmospheres, and a WHSV of about 0.1 hr$^{-1}$ to about 20 hr$^{-1}$.

In order to more fully illustrate the nature of the invention and the manner of practicing same, the following examples are presented.

EXAMPLE 1

To a stirred solution of 18.2 g of 45% sodium aluminate (19.5% $Na_2O$, 25.5% $Al_2O_3$) in 290 cc of distilled water was added 60 g of UltraSil silica (92.4% $SiO_2$, 0.4% $Na_2O$). To the resultant stirred mixture was added 67 g of aqueous 60% triethylenetetramine (trien). The resultant mixture had a pH of approximately 12.2 and is described by the following mole ratios of ingredients:

$SiO_2/Al_2O_3$=20
$Na/SiO_2$=0.13
$Trien/SiO_2$=0.3
$OH/SiO_2$=0.03
$H_2O/SiO_2$=20

The mixture was heated for 65 hours at 160° C. in an autoclave stirred at 200 rpm, cooled, and filtered. The solid product was washed with distilled water and dried at 120° C. It was found to be an apparent mixture and/or intergrowth of ZSM-5 and ZSM-11, as shown by the x-ray diffraction (xrd) pattern in FIG. 1. Thus the apparent single peak at about 45° two-theta is characteristic of ZSM-11, but the obvious presence (for example) of a peak at about 14° is expected for ZSM-5 but not for ZSM-11. On analysis, the sample had a $SiO_2/Al_2O_3$ ratio of 19, a $Na^+/Al$ ratio of 0.25, and a Trien/Al ratio of 0.6. The sample was calcined at 538° C. to remove the organic, exchanged with ammonium ion to remove sodium, and heated to 538° C. to eliminate ammonia. After about 10 minutes on stream, its alpha was 3400. Five minutes later, its alpha was 3500. After an additional 5 minutes on stream, its alpha measured 3500.

EXAMPLE 2

The procedures of Example 1 were repeated but using a different polyamine, tris(2-aminoethyl)amine (tren), as the directing agent and with the ratios of reactants being as follows:

$SiO_2/Al_2O_3$=20
$Na/SiO_2$=0.19
$Tren/SiO_2$ =0.5
$OH/SiO_2$ =0.08
$H_2O/SiO_2$=30

Figure 2:
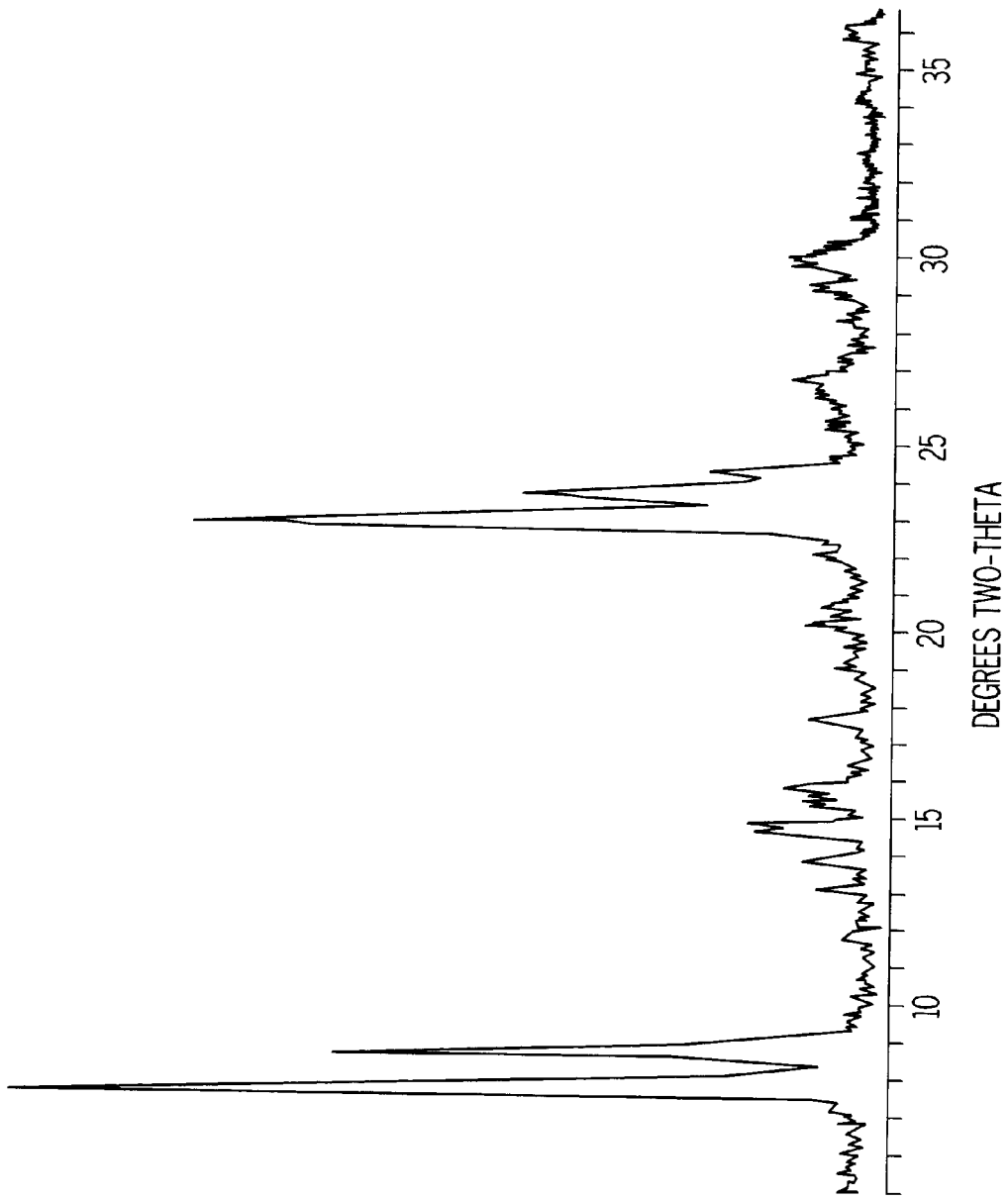
FIG. 2 is the X-ray diffraction pattern of the ammonium form of porous crystalline material formed according to Example 2.
Figure 3:
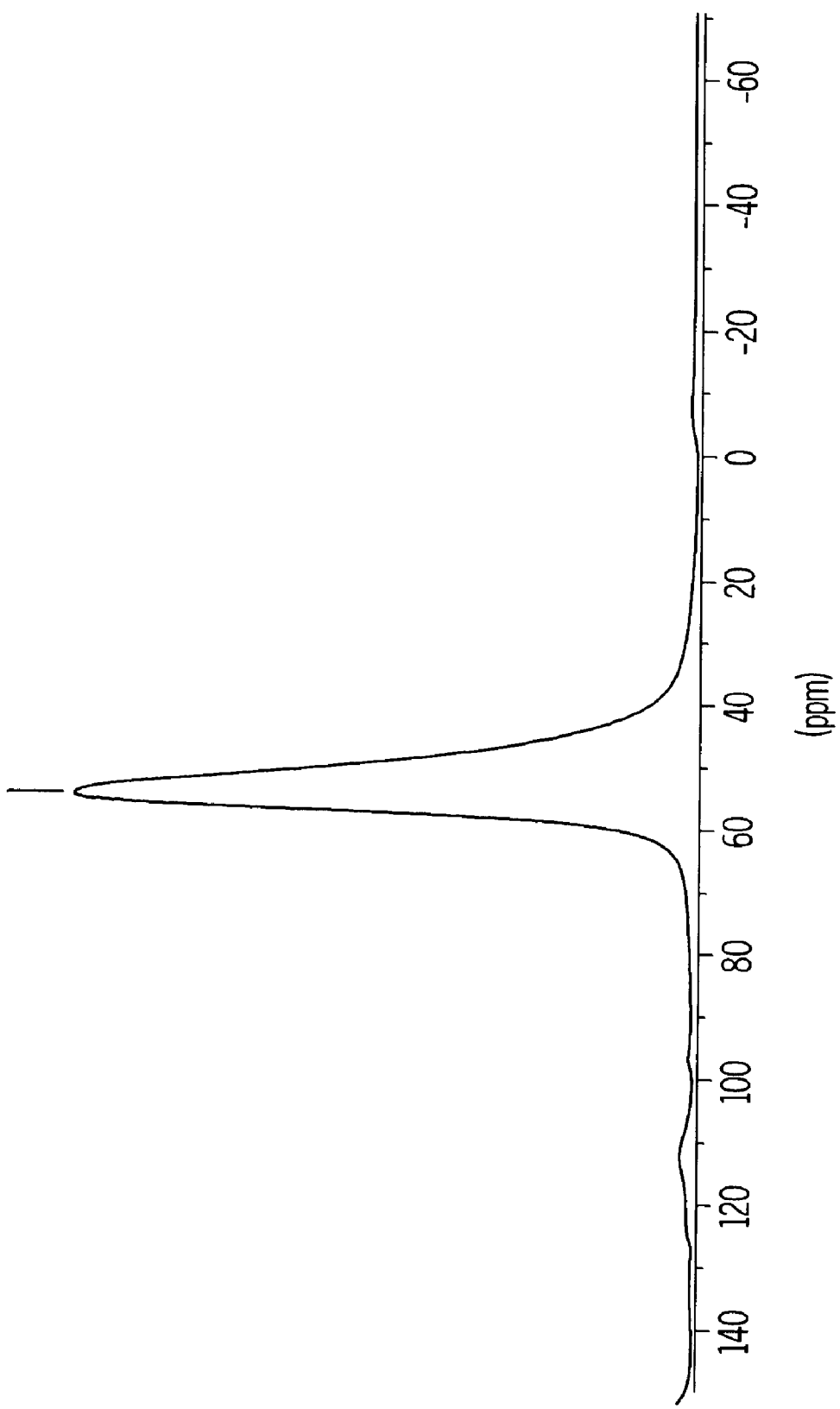
FIG. 3 is the aluminum NMR pattern of the as-synthesized porous crystalline material formed according to Example 2.

The product had the X-ray diffraction pattern of ZSM-5 as shown in FIG. 2 and a small-crystal morphology. Only tetrahedral Al was seen in the NMR spectrum of the as-synthesized zeolite, as shown in FIG. 3. The intensity of the resonance, at 52.7 ppm vs. 3M $Al(NO_3)_3$, corresponded to a ratio of 17. The as-synthesized zeolite had a $SiO_2/Al_2O_3$ ratio of 19, a $Na^+/Al$ ratio of 0.5 and a Tren/Al ratio of 0.4

In its acid form, the zeolite sorbed 12.3% n-hexane ($p/p_0$=0.25). After line-out, three successive measurements yielded alpha values of 2500 ±75.

EXAMPLE 3

The procedures of Example 1 were repeated except that diethylenetriamine (dien) was used and the ratios of reactants were as follows:

SiO$_2$/Al$_2$O$_3$=20
Na/SiO$_2$=0.13
Dien/SiO$_2$=0.5
OH/SiO$_2$=0.03
H$_2$O/SiO$_2$=20

The product was again ZSM-5. As-synthesized, it had a SiO$_2$/Al$_2$O$_3$ ratio of 20, a Na$^+$/Al ratio of 0.6 and a dien/Al ratio of 1.0. In its acid form, the product of Example 3 had an alpha of 2400.

EXAMPLE 4

The procedures of Example 1 were repeated using ethylamine (ea) as the directing agent and with the mole ratios of ingredients as follows:

SiO$_2$/Al$_2$O$_3$=20
Na/SiO$_2$=0.13
Ea/SiO$_2$=2.0
OH/SiO$_2$=0.03
H$_2$O/SiO$_2$=30

The product was again ZSM-5. As-synthesized, it had a SiO$_2$/Al$_2$O$_3$ ratio of 20, a Na$^+$/Al ratio of 0.4 and an ea/Al ratio of 1.1. The as-synthesized also had an (Na$^+$+N)/Al ratio of 1.5, it being appreciated that this ratio must equal or exceed 1.0 for all the Al to be in the zeolite framework. In its acid form, the product of Example 4 had an alpha of 2300.

EXAMPLE 5

The procedures of Example 1 were repeated except that ethylenediamine (en) was used and the ratios of reactants were as follows:

SiO$_2$/Al$_2$O$_3$=26
Na/SiO$_2$=0.11
En/SiO$_2$=1.0
OH/SiO$_2$=0.03
H$_2$O/SiO$_2$=30

The product was again ZSM-5. As-synthesized, it had a SiO$_2$/Al$_2$O$_3$ ratio of 23, a sodium content of 0.57%, a Na$^+$/Al ratio of 0.2 and an en/Al ratio of 1.2.

It is to be noted that the Na$^+$/Al ratios in the products of Examples 1 to 5 were substantially less than one. This implies that the amine inside the zeolite framework is at least partially protonated, i.e., in a partial "quaternary" ammonium form.

What is claimed is:

1. A process for producing a synthetic porous crystalline material having the X-ray diffraction lines listed in Table I comprising the steps of:
   (a) forming a reaction mixture containing sources of alkali or alkaline earth metal (M) cations, an oxide of a trivalent element (X), an oxide of a tetravalent element (Y), a directing agent (R) and water, wherein said reaction mixture has a composition in terms of mole ratios within the following ranges:
   YO$_2$/X$_2$O$_3$=15–35
   H$_2$O/YO$_2$=10–50
   OH$^-$/YO$_2$=0.01–0.2
   M/YO$_2$=0.1–0.5
   R/YO$_2$=0.2–5.0
   and wherein the directing agent R is a non-cyclic amine having the formula (C$_2$H$_6$N)$_n$NH$_q$ wherein n is 2 or 3; q is 0 or 1 and n+q is 3;
   (b) maintaining the reaction mixture under crystallization conditions until crystals of said porous crystalline material are formed; and then
   (c) recovering said crystals from the reaction mixture.

2. A process as claimed in claim 1, wherein said reaction mixture has a composition in terms of mole ratios within the following ranges:
   YO$_2$/X$_2$O$_3$=15–30
   H$_2$O/YO$_2$=15–30
   OH$^-$/YO$_2$=0.02–0.1
   M/YO$_2$=0.1–0.3
   R/YO$_2$=0.5–2.0.

3. A process as claimed in claim 1 wherein said crystallization conditions include temperature of 100 to 200° C. for 6 hours to 10 days.

4. A process as claimed in claim 3 wherein said temperature is 120 to 120° C.

5. A process as claimed in claim 1 wherein the YO$_2$/X$_2$O$_3$ mole ratio of the reaction mixture is 20 to 30, the directing agent (R) is tris(2-aminoethyl)amine and the synthetic porous crystalline material is ZSM-11.

6. A process as claimed in claim 1 wherein the YO$_2$/X$_2$O$_3$ mole ratio of the reaction mixture is 20 to 30, the directing agent (R) is selected from diethylenetriamine and triethylenetetramine and the synthetic porous crystalline material is ZSM-5.

7. A process as claimed in claim 1 wherein said synthetic porous crystalline material has an alpha activity in excess of 1000.

* * * * *